US 6,634,962 B2

(12) United States Patent
Sullivan (10) Patent No.: US 6,634,962 B2
(45) Date of Patent: *Oct. 21, 2003

(54) CROSSLINKED FOAM AS FILLER IN AN INNER LAYER OR CORE OF A MULTI-COMPONENT GOLF BALL

(75) Inventor: Michael J. Sullivan, Barrington, RI (US)

(73) Assignee: The Top-Flite Golf Company, Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,142

(22) Filed: Aug. 6, 2001

(65) Prior Publication Data

US 2002/0016223 A1 Feb. 7, 2002

Related U.S. Application Data

(63) Continuation of application No. 09/391,304, filed on Sep. 7, 1999, now Pat. No. 6,270,429, which is a continuation-in-part of application No. 09/027,482, filed on Feb. 20, 1998, now Pat. No. 6,142,887, application No. 09/923,142, which is a continuation-in-part of application No. 08/815,556, filed on Mar. 12, 1997, said application No. 09/027,482, is a continuation-in-part of application No. 08/714,661, filed on Sep. 16, 1996.

(60) Provisional application No. 60/042,120, filed on Mar. 28, 1997, and provisional application No. 60/042,430, filed on Mar. 28, 1997.

(51) Int. Cl.[7] ............................................. A63B 37/04
(52) U.S. Cl. ....................................................... 473/374
(58) Field of Search ................................. 473/370, 371, 473/367, 368, 373, 374, 376, 377

(56) References Cited

U.S. PATENT DOCUMENTS

| 3,807,733 A | * | 4/1974 | Dearmont ................... 473/125 |
| 4,211,407 A | * | 7/1980 | Tomar ................. 273/DIG. 11 |
| 5,050,886 A | * | 9/1991 | Yamagishi et al. ......... 473/372 |
| 5,123,659 A | * | 6/1992 | Williams ................... 264/46.9 |
| 5,688,191 A | * | 11/1997 | Cavallaro et al. ..... 273/DIG. 20 |
| 5,733,974 A | * | 3/1998 | Yamada et al. ............. 473/365 |
| 5,938,544 A | * | 8/1999 | Winskowicz ................ 473/353 |
| 5,967,907 A | * | 10/1999 | Takemura et al. ... 273/DIG. 22 |
| 6,142,887 A | * | 11/2000 | Sullivan et al. ............. 473/370 |
| 6,270,429 B1 | * | 8/2001 | Sullivan ..................... 473/370 |
| 6,361,453 B1 | * | 3/2002 | Nakamura et al. .......... 473/371 |
| 6,386,992 B1 | * | 5/2002 | Harris et al. ................ 473/356 |

* cited by examiner

Primary Examiner—Mark S. Graham
Assistant Examiner—Raeann Gorden (57) ABSTRACT

Multi-component golf balls comprising one or more interior mantle layers are described in which at least one of the mantle layers includes a plurality of relatively small foam granules dispersed within a polymeric matrix. In another aspect, the multi-component golf balls may instead, or in addition to utilizing foam granules in one or more mantle layers, comprise a plurality of foamed granules dispersed within a core of the ball. The golf balls described herein provide the distance and durability characteristics typically associated with two piece balls while also providing desirable playing characteristics associated with three piece or wound balls.

19 Claims, 2 Drawing Sheets

CROSSLINKED FOAM AS FILLER IN AN INNER LAYER OR CORE OF A MULTI-COMPONENT GOLF BALL

CROSS REFERENCES TO RELATED APPLICATIONS

This application is a continuation of application Ser. No. 09/391,304, filed Sep. 7, 1999, which will issue as U.S. Pat. No. 6,270,429 on Aug. 7, 2001, which is a continuation-in-part and claims priority from U.S. patent application Ser. No. 09/027,482, filed Feb. 20, 1998, now U.S. Pat. No. 6,142,887, which claims priority from U.S. Provisional Application Serial No. 60/042,120, filed Mar. 28, 1997; Provisional Application Serial No. 60/042,430, filed Mar. 28, 1997; and U.S. application Ser. No. 08/714,661, filed Sep. 16, 1996.

FIELD OF THE INVENTION

This invention generally relates to golf balls, and more specifically, to a multi-component golf ball. In particular, this invention relates to a golf ball having a core, at least one cover layer, and one or more interior mantle layers disposed between the core and cover layer. Relatively small foam granules are dispersed throughout one or more of the mantle layers, the core, or both. The multi-component golf balls of the present invention, having such a configuration and using such foam granules, have been found to provide the distance and durability characteristics approaching that of a conventional two-piece ball while also providing the "click and feel" of a conventional three-piece or "wound" ball.

BACKGROUND OF THE INVENTION

Conventional golf balls can be divided into two general types or groups, two-piece balls or wound balls (also known as three-piece balls). The difference in play characteristics resulting from these different types of constructions can be quite significant.

Balls having a two-piece construction are generally most popular with the average recreational golfer because they provide a very durable ball while also providing maximum distance. Two-piece balls are made with a single solid core, usually made of a crosslinked rubber, which is encased by a cover material. Typically, the solid core is made of polybutadiene which is chemically crosslinked tough, cut-proof blended cover. The cover is generally material such as SURLYN®, which is a trademark for an ionomer resin produced by DuPont. The combination of the core and cover materials provide a "hard" ball that is virtually indestructible by golfers. Further, such a combination imparts a high initial velocity to the ball which results in improved distance. Because these materials are very rigid, two piece balls have a hard "feel" when struck with a club. Likewise, due to their hardness, these balls have a relatively low spin rate which makes them difficult to control, particularly in shorter approach shots. However, as golf ball manufacturers continue to improve the spin and feel characteristics of the two-piece ball, it is likely that the two-piece ball will continue to grow in popularity.

But, at the present time, the wound ball remains the preferred ball of the more advanced players due to its superior spin and feel characteristics. Wound balls typically have either a solid rubber or liquid center core around which many yards of a stretched elastic thread or yarn are wound. The wound core is then covered with a durable cover material such as a SURLYN® or similar material or a softer cover such as Balata. Wound balls are generally softer and provide more spin, which enables a skilled golfer to have more control over the ball's flight. However, wound higher spinning balls typically have a shorter distance as compared to a two-piece ball. Moreover, as a result of their more complex structure, wound balls generally require a longer time to manufacture and are more expensive to produce than a two-piece ball.

Consequently, a need exists for an improved ball which provides the "click and feel" of a wound ball, while also providing the relative ease of manufacturing, durability and distance of a two-piece ball.

DESCRIPTION OF THE PRIOR ART

Several patents have been issued which are directed toward modifying the properties of a conventional two-piece ball by altering the typical single-layer core and single cover layer construction to provide a multi-layer core. The developments disclosed in the prior art patents are directed toward improving a variety of golf ball characteristics.

Several patents are directed toward improving the carry distance of ball having improved rebound characteristics in order to increase its flight distance. This golf ball has a center portion and an outer layer formed from a rubber composition, preferably having a base rubber of polybutadiene, wherein the outer layer further contains a gravity filler such as tungsten or tungsten carbide so as to impart a higher specific gravity to the outer layer than that of the inner layer. The difference in specific gravity of the layers should be 0.15–0.8 for small balls and 0.15–0.45 for large balls. Preferably, the outer layer is harder than the center portion.

U.S. Pat. No. 5,184,828 relates to a solid three-piece golf ball having improved rebound characteristics and carry distance while maintaining an adequate spin rate. These characteristics are obtained by controlling the size of the inner core and outer layer as well as the specific gravity and hardness. The core and mantle layers are made from a rubber compound such as polybutadiene, and have a Shore D hardness of 30–62 and 30–56, respectively. The key to obtaining the desired rebound characteristics is that the maximum hardness (42–62) must be located at the interface between the core and the mantle and the hardness must then decrease both inwardly and outwardly.

U.S. Pat. No. 4,714,253 is also directed toward a three-piece golf ball having an excellent rebound coefficient. This golf ball has a core with a Shore C hardness of 57–80 in its center, but not more than 83 at a distance between 5–10 mm from its center and outer layer with a Shore C hardness of 70–83.

Additionally, there are a number of patents also directed toward improving the spin, click or feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. It is desirable that the center core is softer than the outer layer, each having a hardness (Shore C) of 25–50 and 70–90, respectively.

U.S. Pat. No. 4,625,964 relates to a solid golf ball having a polybutadiene rubber core of a diameter not more than 32 mm, and a polybutadiene rubber intermediate layer having a specific gravity of lower than that U.S. Pat. No. 4,650,193 is directed toward a solid golf ball having a core comprising a central portion and an integral outer layer. Preferably, the core is a curable elastomer such as polybutadiene which is treated with a cure altering agent to soften an outer layer of the core, thereby producing a central layer with a hardness (Shore C) of greater than 75 and an outer layer with a hardness (Shore A) of less than 80.

U.S. Pat. No. 4,848,770 discloses a non-wound, three-piece golf ball which includes a core of a highly filled synthetic rubber or polymeric material, an intermediate mantle of an unfilled synthetic rubber and a cover. The core and intermediate mantle have a hardness of between 50–95.

U.S. Pat. No. 5,002,281 is directed toward a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

U.S. Pat. No. 5,253,871 concerns a golf ball having a three-piece structure comprising an elastomer core, an intermediate layer of a thermoplastic material containing at least 10% of ether block copolymer, preferably blended with an ionomer and a thermoplastic cover.

Further, there are also several patents which are directed to golf balls having multiple cover layers. For example, U.S. Pat. No. 4,431,193 relates to a golf ball having a multi-layer cover wherein the inner layer is a hard, high flexural modulus ionomer resin and the outer layer is a soft, low flexural modulus ionomer resin, and wherein either or both layers may comprise a foamed ionomer resin.

U.S. Pat. No. 5,314,187 also relates to golf balls having a multiple layer cover, wherein the outer layer is molded over the inner layer and comprises a blend of balata and an elastomer and the inner layer is an ionomer resin.

U.S. Pat. No. 4,919,434 is directed toward a golf ball having a cover which comprises an inner layer and an outer layer each of which comprise a thermoplastic resin. Preferably the layers comprise materials that are capable of fusion bonding with each other.

Prior artisans have attempted to incorporate metal layers or metal the balls. For example, U.S. Pat. No. 3,031,194 to Strayer is directed to the use of a spherical inner metal layer that is bonded or otherwise adhered to a resilient inner constituent within the ball. The ball utilizes a liquid filled core. U.S. Pat. No. 4,863,167 to Matsuki, et al. describes golf balls containing a gravity filler which may be formed from one or more metals disposed within a solid rubber-based core. U.S. Pat. Nos. 4,886,275 and 4,995,613, both to Walker, disclose golf balls having a dense metal-containing core. U.S. Pat. No. 4,943,055 to Corley is directed to a weighted warmup ball having a metal center.

Prior artisans have also described golf balls having one or more interior layers formed from a metal, and which feature a hollow center. Davis disclosed a golf ball comprising a spherical steel shell having a hollow air-filled center in U.S. Pat. No. 697,816. Kempshall received numerous patents directed to golf balls having metal inner layers and hollow interiors, such as U.S. Pat. Nos. 704,748; 704,838; 713,772; and 739,753. In U.S. Pat. Nos. 1,182,604 and 1,182,605, Wadsworth described golf balls utilizing concentric spherical shells formed from tempered steel. U.S. Pat. No. 1,568,514 to Lewis describes several embodiments for a golf ball, one of which utilizes multiple steel shells disposed within the ball, and which provide a hollow center for the ball.

As to the incorporation of glass or vitreous materials in golf balls, U.S. Pat. No. 985,741 to Harvey discloses the use of a glass shell. Other artisans described incorporating glass microspheres within a golf ball such as in U.S. Pat. No. 4,085,937 to Schenk.

In contrast, the use of polymeric materials in intermediate layers within a golf ball, is more popular than, for instance, the use of glass or other vitreous material. Kempshall disclosed the use of an interior coating layer of plastic in U.S. Pat. Nos. 696,887 and 701,741. Kempshall further described incorporating a fabric layer in conjunction with a plastic layer in U.S. Pat. Nos. 696,891 and 700,656. Numerous subsequent approaches were patented in which a plastic inner layer was incorporated in a golf ball. A thermoplastic outer core layer was disclosed in U.S. Pat. No. 3,534,965 to Harrison. Inner synthetic polymeric layers are noted in U.S. Pat. No. 4,431,193 to Nesbitt. An inner layer of thermoplastic material surrounding a core is described in U.S. Pat. No. thermoplastic is disclosed in U.S. Pat. No. 5,253,871 to Viellaz. Golf balls with thermoplastic interior shell layers are described in U.S. Pat. No. 5,480,155 to Molitor, et al.

Although satisfactory in many respects, these patents are not specifically directed to the use of a particular configuration of foamed material dispersed within a particular type of polymeric material as utilized in the present invention and described herein.

Prior artisans have attempted to incorporate various particles and filler materials into golf ball cores and intermediate layers. U.S. Pat. No. 3,218,075 to Shakespeare discloses a core of fiberglass particles dispersed within an epoxy matrix. Similarly, U.S. Pat. No. 3,671,477 to Nesbitt discloses an epoxy-based composition containing a wide array of fillers. A rubber intermediate layer containing various metal fillers is noted in U.S. Pat. No. 4,863,167 to Matsuki, et al. Similarly, a rubber inner layer having filler materials is noted in U.S. Pat. No. 5,048,838 to Chikaraishi, et al. More recently, a golf ball with an inner layer of reinforced carbon graphite is disclosed in U.S. Pat. No. 5,273,286 to Sun.

However, none of these patents disclose a multi-layer ball having the materials and material property requirements as disclosed herein to provide the improved golf balls of the present invention.

In view of the ever increasing demands of the current golf industry, there exists a need for yet another improved golf ball design and construction. Specifically, there is a need for a golf ball that exhibits a high initial velocity or coefficient of restitution (COR), may be driven relatively long distances in regulation play, and which may be readily and inexpensively manufactured. And, there is a need for such a golf ball that further exhibits desirable "click and feel" characteristics.

These and other objects and features of the invention will be apparent from the following summary and description of the invention, the drawings, and from the claims.

SUMMARY OF THE INVENTION

The present invention is directed toward, in a first aspect, a golf ball comprising a core, a cover assembly disposed about the core, and a mantle layer disposed about the core, between the core and the cover layer. The mantle layer comprises a polymeric matrix material and a plurality of foam granules dispersed within the polymeric matrix material. The granules have a mean diameter of from about 0.001 inches to about 0.200 inches. The cover assembly may include one or more cover layers.

In yet another aspect, the present invention provides a golf ball comprising a core, a cover layer disposed about the core, and an interior mantle layer surrounding the core and disposed between the core and the cover layer. The mantle layer comprises a plurality of foam particles dispersed within a polymeric matrix material. The particles comprise one or more materials selected from a specific set of materials. The cover may be of a single or multi-layer configuration.

In yet a further aspect, the present invention provides a golf ball comprising a core, a cover layer disposed about the core, and an interior primary mantle surrounding the core and disposed between the core and the cover layer. The primary mantle includes a matrix material and a plurality of foam granules dispersed within the matrix material. The weight ratio of the granules to the matrix material is in a range of from about 10 to 95% of the matrix material to about 5 to 90% of the granules. The cover may include one or more cover layers.

In another aspect, the present invention provides a golf ball comprising a core, at least one cover layer disposed about the core, and a plurality of foam granules dispersed in the core. The foam granules have a mean diameter of from about 0.001 inches to about 0.200 inches.

In an additional aspect, the present invention provides a golf ball comprising a core, at least one cover layer disposed about the core, an interior mantle layer surrounding the core and disposed between said core and said cover, and a plurality of foam particles dispersed within either or both the core and the mantle layer. The foam particles are formed from one or more specific classes of materials.

BRIEF DESCRIPTION OF THE DRAWINGS

The above and other objects, features, and advantages of the present invention will be better understood from the following description taken in conjunction with the accompanying drawings as follows.

It will be appreciated that these drawings are not necessarily to scale, and are schematic in nature, particularly FIGS. 1, 3, and 4.

DETAILED DESCRIPTION OF THE PREFERRED EMBODIMENTS

The present invention provides, in a particularly preferred aspect, a golf ball comprising a plurality of foamed granules dispersed throughout a polymeric matrix material in one or more interior mantle layers, and/or a core within the ball. The foamed granules are relatively small and are preferably dispersed throughout a thermoplastic or thermoset matrix material.

Figure 1:
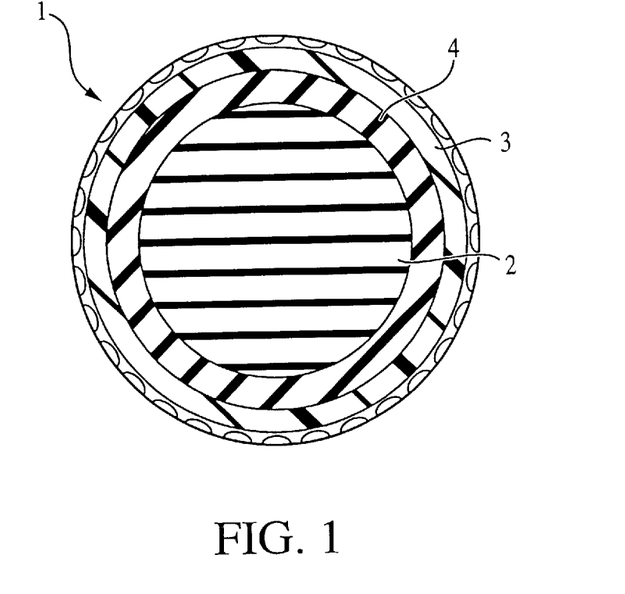
FIG. 1 is a cross-sectional view of a preferred embodiment golf ball according to the present invention.
Figure 2:
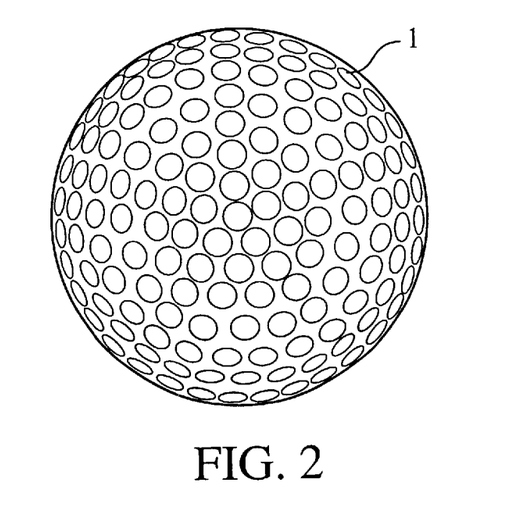
FIG. 2 is a view of the preferred embodiment golf ball according to the present invention and illustrated in FIG. 1.

Referring to FIGS. 1 and 2, a preferred embodiment of the present invention golf ball is illustrated as a multi-layer golf ball 1 which comprises a core 2, at least one cover layer 3, and at least one primary mantle 4 disposed therebetween. The preferred embodiment golf balls described herein all have dimpled outer surfaces. These various components and other aspects of the preferred embodiment golf balls are described in greater detail below.

Mantle and Foam Granules

The preferred embodiment golf balls comprise at least one interior mantle layer that includes a plurality of foam particles or granules dispersed throughout a polymeric matrix material. The term "foam granules" as utilized herein herein, and having a structure characterized by a plurality of cells or chambers, defined throughout, or at least substantially so, the granule. The cells or chambers may range in size, e.g. have an average interior span, from about 0.00001 inches to about 0.0001 inches. Preferably, the structure of the foam granules resembles that of a foam. All, a portion, or none of the cells or chambers may be connected to adjacent cells or chambers. All, a portion, or none of the cells or chambers may be filled with air, one or more other gases, or the matrix material. It is to be understood that the term foam granules does not imply or mean that the granules utilized in the present invention must be formed according to a foaming process. That is, the foam granules may be produced by other methods such as leaching or erosion strategies.

Figure 3:
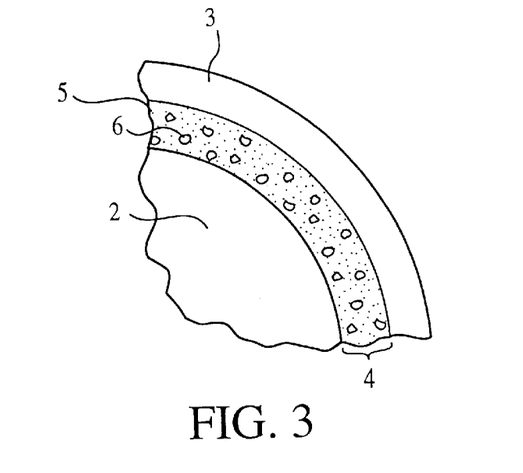
FIG. 3 is a detailed schematic view of a portion of a mantle layer of another preferred embodiment golf ball according to the present invention.

The at least one interior mantle layer is referred to herein as a primary mantle. FIG. 3 illustrates a preferred embodiment primary mantle 4 that includes foamed granules 6 dispersed within a polymeric matrix 5.

The preferred foam granules range in size from a mean diameter of about 0.001 to about 0.200 inches, and most preferably from about 0.0012 inches to about 0.180 inches. The foam granules preferably have a specific gravity of from about 0.01 to about 0.8, and most preferably from about 0.1 to about 0.7.

The matrix and the granules may be formed from a wide array of materials such as, but not limited to, ionomers, non-ionomeric polyolefins, metallocene catalyzed polymer, polyethylene ethyl or methyl acrylate, styrene butadiene elastomer, thermoplastic polyester, thermoplastic polyetherester, thermoplastic polyetheramide, polyamide, polycarbonate, polyphenylene oxide, thermoplastic or thermoset polyurethane, silicone elastomer, dynamically vulcanized elastomer, or combinations or blends of the foregoing. Additional examples of materials suitable for the primary mantle are set forth below.

In all preferred embodiments described herein, it is significant that the granules which are dispersed within and generally throughout one or more mantle layers and/or a core of a golf ball be formed from a material or composition that is different from the material or composition of the matrix constituting the mantle layer(s) and/or core. It is known in the prior art to form cellular or foamed regions in a layer of material having a constant composition throughout the layer. The upon, at least in part, the incorporation of foamed granules having a composition that is different than the composition of the matrix throughout which they are dispersed.

The foam granules may be prepared according to a wide variety of methods known in the art. Preferably, the granules are prepared by known foaming techniques. Conventional blowing agents may be used. Once foamed and after sufficiently curing to a rigid solid form, the material is subjecting to a sizing operation such as a granulating process so that the foamed material is processed into fine particles preferably having the previously described mean diameters.

As previously noted, the foamed granules may utilize either an open cell foam structure, a closed cell foam structure, or a hybrid structure that includes both open and closed cells.

A comprehensive description of foamed plastics and their production is provided in *Kirk Othmer Encyclopedia of Chemical Technology*, under "Foamed Plastics," Vol. 11, Fourth Edition, pages 730 to 783, herein incorporated by reference.

Preferably, the foam granules are crosslinked. Crosslinking of the granules may be performed before, during, or after incorporation of the granules into the polymeric matrix described in greater detail herein.

The preferred overall thickness of the primary mantle layer is from about 0.010 inches to about 0.500 inches, more preferably from about 0.020 inches to about 0.300 inches, and most preferably from about 0.050 inches to about 0.250 inches.

Preferably, the granules and matrix material are combined together in a particular weight ratio, such as from about 10 to 95% matrix to about 5 to 90% granules. More preferably, the granules and matrix material are combined in a weight ratio of from about 25 to 90% matrix to about 10 to 75% granules, and most preferably, from about 50 to 85% matrix to about 15 to 50% granules.

In addition to the previously described primary mantle layer comprising foam granules dispersed in a matrix material, the preferred embodiment golf balls may further include one or more optional secondary mantle layers as follows. The one or more secondary mantle layers are disposed at any region within a golf ball, between a core and a cover layer. Preferably, the one or more secondary mantle layers are disposed adjacent to the primary mantle layer.

The secondary mantle layer may comprise any of the materials noted for use in the primary mantle. The secondary mantle preferably comprises thermoplastic polyetherester, thermoplastic polyester, dynamically vulcanized thermoplastic elastomer, functionalized styrene-butadiene elastomer, thermoplastic polyurethane or metallocene polymer or blends thereof.

In a preferred embodiment of the present invention, the secondary mantle layer is a thermoplastic polyetherester. Suitable thermoplastic polyetheresters include Hytrel® 3078, Hytrel® G3548W, and Hytrel® G4078W which are commercially available from DuPont. Hytrel® 3078 is the most preferred. The mantle layer preferably has a specific gravity greater than 1 and less than 1.2.

Suitable commercially available dynamically vulcanized thermoplastic elastomers for use in the primary and/or secondary mantles, include Santoprene®, Sarlink®, Vyram®, Dyton®, and Vistaflex®. Santoprene® is the trademark for a dynamically vulcanized PP/EPDM. Santoprene® 203-40 is an example of a preferred Santoprene® and is commercially available from Advanced Elastomer Systems. Examples of suitable functionalized styrene-butadiene elastomers include Kraton FG-1901x, which is available from the Shell Corporation. Examples of suitable thermoplastic polyurethanes include Estane® 58133, Estane® 58134, and Estane® 58144, which are commercially available from the B.F. Goodrich Company. Suitable metallocene polymers whose melting points are higher than the cover materials can also be employed in the primary and/or secondary mantle layer of the present invention golf balls. Further, the materials for the primary and/or secondary mantle layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass. In a preferred embodiment of the present invention, the secondary mantle layer comprises Santoprene®, thermoplastic polyurethane or blends thereof.

In another preferred embodiment of the present invention, the one or thermoplastic, wherein the first thermoplastic is a dynamically vulcanized thermoplastic elastomer, a functionalized styrene-butadiene elastomer, a thermoplastic polyurethane or a metallocene polymer and the second thermoplastic is a material such as a thermoplastic polyurethane, a thermoplastic polyetherester or polyetheramide, a thermoplastic ionomer resin, a thermoplastic polyester, another dynamically vulcanized elastomer, another functionalized styrene-butadiene elastomer, another metallocene polymer or blends thereof.

For this blended embodiment, suitable thermoplastic polyetheresters include Hytrel® 3078, Hytrel® G3548W, and Hytrel® G4078W which are commercially available from DuPont. Suitable thermoplastic polyetheramides include Pebax® 2533, Pebax® 3533, and Pebax® 4033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 100 kpsi to about 200 kpsi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably, the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®. It is contemplated that such a blended configuration could also be utilized for the matrix material of the primary mantle.

It is contemplated that any of the previously noted materials suitable for use in the secondary mantle may be employed in the primary mantle comprising the foam granules. It is also contemplated that the previously described foam granules be dispersed in the secondary mantle. And furthermore, it is layers. As described in greater detail herein, the foam granules may also be incorporated in the golf ball core.

Core

The core of the preferred embodiment golf ball of the present invention may comprise a variety of materials, including those typically employed as golf ball cores. The conventional materials for such cores include core compositions having a base rubber, a crosslinking agent, a filler and a co-crosslinking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator which decomposes during the cure cycle. The crosslinking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as zinc oxide, barium sulfate, silica, calcium carbonate, zinc carbonate and the like.

Preferably, the core is a cross-linked 1,4-polybutadiene having a specific gravity greater than 1.1 and, more preferably, about 1.25. The high specific gravity of the core decreases the spin rate of the ball for a lower flight path. Also, the PGA compression of the core is preferably greater than 60 and, more preferably, about 65.

In one embodiment of the present invention, the core comprises a center which is liquid-filled or solid, around which an elastic thread is wound. The solid center is typically a homogenous mass of a resilient material such as polybutadiene or a natural rubber. The liquid-filled center is typically a thin walled sphere into which a liquid such as corn syrup is injected by means of a hypodermic needle. The sphere is then sealed and frozen to make the center a solid mass. The windings for either type of center are provided by an elastic thread which is stretched and wound about the center to a desired thickness. It will be understood that although the noted foam particles are generally used as an alternative to a wound core, both may be used together.

Conventionally, the centers of wound cores have a diameter of about 1.0 to about 1.125 inches. The outer diameter of a conventional wound core is about 92% of the overall diameter of the finished ball. However, the outer diameter of wound cores employed in this embodiment of the present invention have an overall diameter of less than 90% of the overall diameter of the finished ball. Preferably, the wound cores have a diameter of about 75–90% of the overall diameter of the finished ball. Most preferably, the wound cores of the present invention have an overall diameter of about 85% of the diameter of the finished ball.

It should be appreciated that a wide variety of materials can be utilized for the core including solid materials, gels, hot-melts, liquids, and other materials which at the time of their introduction into a shell, can be handled as a liquid. Examples of suitable gels include water gelatin gels, hydrogels, and water/methyl cellulose gels. Hot-melts are materials that are heated to become liquid and at or about normal room temperatures become solid. This property allows their easy injection into the interior of the ball to form the core. Examples of suitable liquids include either solutions such as glycol/water, salt in water or oils or colloidal suspensions, such as clay, barytes, carbon black in water or other liquid, or salt in water/glycol mixtures.

A preferred example of a suitable liquid core material is a solution of inorganic salt in water. The inorganic salt is preferably calcium chloride. Other liquids that have been successfully used are conventional hydraulic oils.

The liquid material, which is inserted in the interior of the golf ball may also be reactive liquid systems that combine to form a solid. Examples of suitable reactive liquids are silicate gels, agar gels, peroxide cured polyester resins, two-part epoxy resin systems and peroxide cured liquid polybutadiene rubber compositions. It will be understood by those skilled in the art that other reactive liquid systems can likewise be utilized depending on the physical properties of the adjacent mantle and the physical properties desired in the resulting finished golf balls.

The core of all embodiments, whether remaining a solid, a liquid or ultimately becoming a solid, should be unitary, that is, of a substantially common material throughout its entire extent or cross-section, with its exterior surface in cores are also essentially substantially homogenous throughout, except for a cellular or foamed embodiment described herein.

In the preferred embodiments, in order to provide a golf ball which has similar physical properties and functional characteristics to conventional golf balls, preferably the core material will have a specific gravity greater than that of the shell or mantle (and the outer cover when such a cover is molded over the shell). Specifically, the core material may have a specific gravity of between about 0.10 and about 3.9, preferably at about 1.05. Thus, it will be understood by those skilled in the art that the specific gravity of the core may be varied depending on the physical dimensions and density of the outer shell and the diameter of the finished golf ball.

Solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the formulator may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solids layer beneath the cover and above the core as in U.S. Pat. No. 4,431,193, herein incorporated by reference, and other multi layer and/or non-wound cores.

Wound cores are generally produced by winding a very long elastic thread around a solid or liquid filled balloon center. The elastic thread is wound around a frozen center to produce a finished core of about 1.4 to 1.7 inches in diameter, generally.

The preferred embodiment golf ball may also comprise a cellular core comprising a material having a porous or cellular configuration. Suitable materials for a cellular core include, but are not limited to, foamed elastomeric materials such as, for example, crosslinked polybutadiene/ZDA mixtures, polyurethanes, polyolefins, ionomers, metallocenes, polycarbonates, nylons, polyesters, and polystyrenes. Preferred materials include polybutadiene/ZDA mixtures, ionomers, and metallocenes. The most preferred materials are foamed crosslinked polybutadiene/ZDA mixtures.

If the cellular core is used in conjunction with a relatively dense mantle, the selection of the type of material for the mantle will determine the size and density for the cellular core. A hard, high modulus metal will require a relatively thin mantle so that ball compression is not too hard. If the mantle is relatively thin, the ball may be too light in weight so a cellular core will be required to add weight and, further, to add resistance to oil canning or deformation of the mantle.

The weight of the cellular core can be controlled by the cellular density. The cellular core typically has a specific gravity of from about 0.10 to about 1.0. The coefficient of restitution of the cellular core should be at least 0.500.

The structure of the cellular core may be either open or closed cell. It is preferable to utilize a closed cell configuration with a solid surface skin that can be metalized or receive a conductive coating. The preferred cell size is that required to obtain an apparent specific gravity of from about 0.10 to about 1.0.

In a preferred method, a cellular core is fabricated and a metallic cover applied over the core. The metallic cover may be deposited by providing a conductive coating or layer about the core and electroplating one or more metals on that coating to the required thickness. Alternatively, two metallic half shells can be welded together and a flowable cellular material, for example a foam, or a cellular core material precursor, injected through an aperture in the metallic sphere using a two component liquid system that forms a semi-rigid or rigid material or foam. The fill hole in the mantle may be sealed to prevent the outer cover stock from entering into the cellular core during cover molding. Application of these techniques will be appreciated and may be similarly used if the mantle is ceramic or polymeric.

If the cellular core is prefoamed or otherwise foamed prior to applying the metallic layer, the blowing agent may be one or more conventional agents that release a gas, such as nitrogen or carbon dioxide. Suitable blowing agents include, but are not limited to, azodicarbonamide, N,N-dinitros-opentamethylene-tetramine, 4-4 oxybis (benzenesulfonyl-hydrazide), and sodium bicarbonate. The preferred blowing agents are those that produce a fine closed cell structure forming a skin on the outer surface of the core.

A cellular core may be encapsulated or otherwise enclosed by the mantle, for instance by affixing two hemispherical halves of a shell together about a cellular core. It is also contemplated to introduce a foamable cellular core material precursor within a hollow spherical mantle and subsequently foaming that material in situ.

In a most preferred aspect of the present invention, it is desirable to incorporate the previously described foam granules in the core or core formulations. The previously noted granule sizes and materials, and ratios of granules to matrix material are utilized for the granules incorporated in the cores and/or core materials. Preferably, previously formed foam granules of desired size and specific gravity are incorporated into and dispersed within the material utilized in forming the core.

Figure 4:
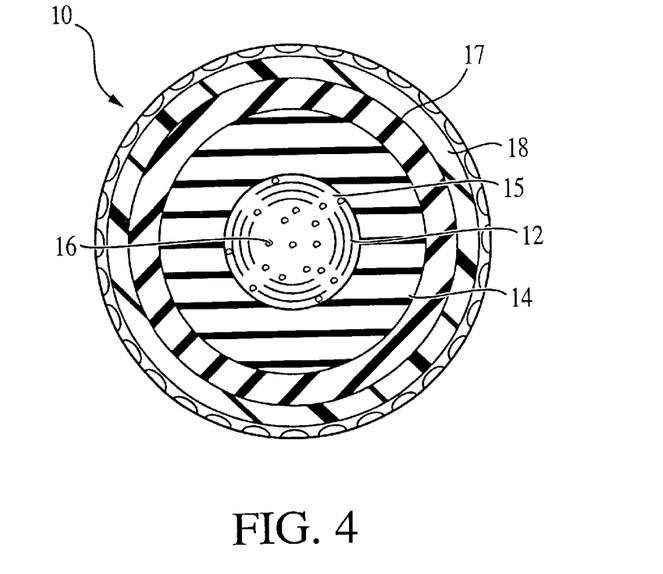
FIG. 4 is a cross-sectional view of yet another preferred embodiment golf ball according to the present invention.

FIG. 4 is a cross-sectional view of another preferred embodiment golf ball 10 according to the present invention. Golf ball 10 comprises a core 12 including a plurality of foam granules 16, as described herein, dispersed throughout a polymeric matrix 15. The golf ball 10 further comprises one or more mantles 14, such as a primary or secondary mantle as previously described. The preferred embodiment ball 10 also includes a multi-layer cover including an inner cover 17 and an outer cover 18. The one or more mantle layers 14 disposed about the core 12, may also include the foam granules as previously described herein. The inner cover layer 17 preferably is disposed about the one or more mantle layers 14. It is contemplated that the golf ball 10 may include the foam granules 16 within the core 12, foam granules dispersed within one or more mantle layers 14, or foam granules 16 dispersed in both the core 12 and one or more mantle layers 14.

Cover

The cover layer of the preferred embodiment golf balls of the present invention comprises at least one layer of a thermoplastic or thermoset material. Any number of a wide variety of cover materials may be used in the preferred embodiments of the present invention. Among the preferred conventional cover materials are ionomer resins and low modulus ionomers obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, low modulus ionomers, such as acid-containing ethylene copolymer ionomers, include EIX copolymers where E is ethylene, X is a softening comonomer such as acrylate or methacrylate present in 5–35 (preferably 10–35, most preferably 15–20) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations. Preferably, cations such as lithium, sodium, magnesium, zinc and/or combinations are employed. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth) acrylic acid-n-butyl acrylate, ethylene/(meth)acrylic acid/ethyl acrylate, and ethylene/(meth) acrylic acid/methyl acrylate copolymers.

The manner in which these ionomers are made is well known in the art as described in, e.g., U.S. Pat. No. 3,262,272, herein incorporated by reference. Such ionomer resins are commercially available from DuPont Co. under the tradename SURLYN®. The presently preferred cover material is a 50/50 blend of SURLYN® 8140 and SURLYN® SEP671, which is a lithium SURLYN® having about 19% methacrylic acid. This material has a flex modulus of about 105 ksi. Preferably, the flex modulus of the cover is greater than 80 ksi. Still further, the preferred cover has a hardness of about 70 Shore D. The high flex modulus of the cover provides increased initial velocity and a low spin rate.

In another preferred embodiment of the present invention, the cover layer comprises an inner layer and an outer layer. For instance, FIG. 4 illustrates an inner cover layer 17 and an outermost cover layer 18. The inner layer of the cover is either a thermoplastic material such as a thermoplastic elastomer or a thermoplastic rubber, or a thermoset rubber or thermoset elastomer material. Some examples of materials suitable for use as the inner cover layer include polyether or polyester thermoplastic urethanes as well as thermoset polyurethanes. A preferable thermoset material is a rubber based, castable urethane. The outer layer of the cover is either a thermoplastic plastic material such as an elastomer or a thermoplastic rubber, or a thermosetting material.

Suitable materials for the outer layer include urethanes, ionomers with a low modulus and other "dead" but durable materials such as EPDM and butyl rubber. Additionally, the present invention also contemplates the use of a polymeric foam material, such as the metallocene-based foamed resin described above, as the material for either the outer cover layer or the inner cover layer, but preferably not both layers.

In another preferred embodiment of the present invention, it is preferable that the thermoplastic or thermosetting materials of the outer layer have a melting point or heat of reaction (cure) temperature less than the melting point or heat of reaction (cure) temperature of the materials of the inner layer.

In yet another embodiment, the polymeric outer cover layer is comprised of a low acid (less than about 16 weight percent acid) ionomer, a high acid (greater than about 16 weight percent acid) ionomer, an ionomer blend, a non-ionomeric elastomer, a thermoset material, or blends or combinations thereof. In some applications it may be desirable to provide an outer cover that is relatively soft and that has a low modulus (about 1,000 psi to about 10,000 psi). The non-ionomeric elastomers are preferably thermoplastic elastomers such as, but not limited to, a polyurethane, a polyester elastomer such as that marketed by DuPont under the trademark Hytrel®, a polyester amide such as that marketed by Elf Atochem S.A. under the trademark Pebax®, or combinations thereof.

For outer cover compositions comprising a high acid ionomer, several new metal cation neutralized high acid ionomer resins are particularly preferred. These high acid ionomers have been produced by neutralizing, to various extents, high acid copolymers of an alpha-olefin and an alpha, beta-unsaturated carboxylic acid with a wide variety of different metal cation salts. More particularly, it has been found that numerous new metal cation neutralized high acid ionomer resins can be obtained by reacting a high acid copolymer (i.e., a copolymer containing greater than about 16 percent by weight acid, preferably from about 17 to about 25 weight percent acid, and more preferably about 20 weight percent acid), with a metal cation salt capable of ionizing or neutralizing the copolymer to the extent desired (i.e., from about 10% to 90%).

The base copolymer is made up of greater than 16 percent by weight of an alpha, beta-unsaturated carboxylic acid and alpha-olefin. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotomic acid, maleic acid, fumaric acid, and itacomic acid, with acrylic acid being preferred.

Consequently, examples of a number of copolymers suitable for use in the invention include, but are not limited to, high acid embodiments of an ethylene/acrylic acid copolymer, an ethylene/methacrylic acid copolymer, an ethylene/itaconic acid copolymer, an ethylene/maleic acid copolymer, etc. The base copolymer broadly contains greater than 16 percent by weight unsaturated carboxylic acid, and less than 84 percent by weight alpha-olefin. Preferably, the copolymer contains about 20 percent by weight unsaturated carboxylic acid and about 80 percent by weight ethylene. Most preferably, the copolymer contains about 20 percent acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid copolymers are described in greater detail in U.S. Pat. Nos. 5,688,869 and 5,542,677, both of which are herein incorporated by reference.

Alternatively, the outer layer may include a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard) ionomer with a low modulus (soft) ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240. A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e., approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

The hard ionomeric resins developed by Exxon Corporation and introduced under the designation Escor® and sold under the designation "Iotek" are somewhat similar to the hard ionomeric resins developed by E. I. DuPont de Nemours & Company and sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer cover layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 1:

TABLE 1

Typical Properties of Commercially Available Hard Surlyn ® Resins Suitable for Use in the Outer Layer Blends of the Preferred Embodiments

| | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m₂ (ft.-lbs./in²) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present outer cover composition sold under the "Iotek" trade name by the Exxon Corporation include Iotek 4000, Iotek 4010, Iotek 8000, Iotek 8020, and Iotek 8030. The typical properties of these and other Iotek hard ionomers suited for use in formulating the outer layer cover composition are set forth below in Table 2:

TABLE 2

Typical Properties of Iotek Ionomers

| | ASTM Method | Units | 4000 | 4010 | 8000 | 8020 | 8030 |
|---|---|---|---|---|---|---|---|
| Resin Properties | | | | | | | |
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m³ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid | | | 16 | | 11 | | |
| % of Acid Groups cation neutralized | | | 30 | | 40 | | |
| Plaque Properties (3 mm thick, compression molded) | | | | | | | |
| Tensile at break | D-638 | MPa | 24 | 26 | 36 | 31 5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |

TABLE 2-continued

Typical Properties of Iotek Ionomers

| Film Properties (50 micron film 2.2:1 Blow-up ratio) | | | | | | | |
|---|---|---|---|---|---|---|---|
| Tensile at Break | | | | | | | |
| MD | D-882 | MPa | 41 | 39 | 42 | 52 | 47.4 |
| TD | D-882 | MPa | 37 | 38 | 38 | 38 | 40.5 |
| Yield point | | | | | | | |
| MD | D-882 | MPa | 15 | 17 | 17 | 23 | 21.6 |
| TD | D-882 | MPa | 14 | 15 | 15 | 21 | 20.7 |
| Elongation at Break | | | | | | | |
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m³ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Weight Acrylic Acid | | | — | — | — |
| % of Acid Groups Cation Neutralized | | | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the outer cover composition. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer and an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218, and LDX 219) may be combined with known hard ionomers such as those indicated above to produce the outer cover. The combination produces higher COR's (coefficient of restitution) at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 3

| Property | ASTM Method | Units | Typical Value |
|---|---|---|---|
| Physical Properties of Iotek 7520 | | | |
| Melt Index | D-1238 | g/10 min. | 2 |
| Density | D-1505 | kg/m$^3$ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data collected by the inventor and others indicate that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventor has found that a newly developed grade of an acrylic acid based soft ionomer available from the Exxon Corporation under the designation Iotek 7510, is also effective, when combined with the hard ionomers indicated above in producing golf ball covers exhibiting higher COR values at equal or softer hardness than those produced by known hard-soft ionomer blends. In this regard, Iotek 7510 has the advantages (i.e., improved flow, higher COR values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher COR values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e., a zinc salt of a terpolymer of ethylene, acrylic acid, and methyl acrylate) but is more highly neutralized. Based upon FTIR analysis, Iotek 7520 is estimated to be about 30–40 weight percent neutralized and Iotek 7510 is estimated to be about 40–60 weight percent neutralized. The typical properties of Iotek 7510 in comparison with those of Iotek 7520 are set forth below:

TABLE 4

| Physical Properties of Iotek 7510 in Comparison to Iotek 7520 | | |
|---|---|---|
| | IOTEK 7520 | IOTEK 7510 |
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. Nos. 5,120,791 and 4,884,814, both of which are herein incorporated by reference. The present invention is in no way limited to those examples. It will be understood that ionomer compositions containing about 16 weight percent acid may be referred to as either low acid or high acid. However, for purposes herein, such compositions are generally considered to be low acid.

Moreover, in alternative embodiments, the outer cover layer formulation may also comprise a soft, low modulus non-ionomeric thermoplastic elastomer including a polyester polyurethane such as B.F. Goodrich Company's Estane® polyester polyurethane X4517. According to B.F. Goodrich, Estane® X-4517 has the following properties:

TABLE 5

| Properties of Estane ® X-4517 | |
|---|---|
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to thermoplastic polyurethanes such as: Texin thermoplastic polyurethanes from Mobay Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013, all of which are hereby incorporated by reference; and, Hytrel polyester elastomers from DuPont and Pebax polyester amides from Elf Atochem S.A.

In addition, or instead of the following thermoplastics, one or more thermoset polymeric materials may be utilized for the outer cover. Preferred thermoset polymeric materials include, but are not limited to, polyurethanes, metallocenes, diene rubbers such as cis 1,4 polybutadiene, trans polyisoprene EDPM or EPR. It is also preferred that all thermoset materials be crosslinked. Crosslinking may be achieved by chemical crosslinking and/or initiated by free radicals generated from peroxides, gamma or election beam radiation.

The polymeric outer cover layer is about 0.020 inches to about 0.120 inches in thickness. The outer cover layer is preferably about 0.050 inches to about 0.075 inches in thickness. Together, the mantle and the outer cover layer combine to form a ball having a diameter of 1.680 inches or more, the minimum diameter permitted by the rules of the United States Golf Association and weighing about 1.620 ounces.

The inner and outer cover layers of this embodiment of the invention can be molded about the core and mantle layers through a variety of conventional molding methods. For example, the cover layers can be compression molded, retractable pin injection molded, fixed pin injection molded, cast around the core and mantle or a combination thereof. However, it is important that the materials of the outer layer are characterized in that they have thermal properties such that no flow of the inner layer material occurs during the molding of the outer cover layer about the inner layer, regardless of the process employed to mold the layers.

The inner cover layer of this embodiment of the present invention has a thickness of about 0.005 inches to about 0.040 inches. The outer cover layer has a thickness of about 0.010 inches to about 0.100 inches. Preferably, the inner cover layer has a thickness of about 0.010 inches to about 0.030 inches and the outer cover layer has a thickness of about 0.030 inches to about 0.090 inches.

The present invention also contemplates the use of a variety of non-conventional cover materials. In particular, the cover of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly-(phenylene sulfide), reinforced engineering plastics, acrylonitrile-butadiene, acrylic-styreneacrylonitrile, poly(ethylene terephthalate), poly(butylene terephthalate), poly(ethylene-vinyl alcohol), poly (tetrafluoroethylene) and their copolymers including functional comonomers and blends thereof. These polymers or copolymers can be further reinforced by blending with a wide range of fillers and glass fibers or spheres or wood pulp.

Other Aspects

Properties such as hardness, Bayshore resilience, modulus, core diameter and mantle layer thickness of the golf balls of the present invention have been found to affect play characteristics such as spin, initial velocity and feel of the present invention golf balls.

In particular, the overall thickness of the primary and optional secondary mantle layer of the preferred embodiment balls of the present invention is about 0.005 inches to about 0.6 inches. Preferably, the thickness of the primary and optional secondary mantle layer is about 0.04 inches to about 0.10 inches. Most preferably, the thickness of the primary and secondary mantle layer is about 0.06 inches. Similarly, the diameter of the core of the preferred embodiment golf balls of the present invention is about 1.25 inches to about 1.51 inches. Preferably the diameter of the core is about 1.30 inches to about 1.48 inches. Most preferably, the diameter of the core is about 1.39 inches. The overall diameter of the core and the mantle layer(s) is about 84% to about 97% of the overall diameter of the finished ball, and is preferably about 1.51 inches.

The present multi-layer golf ball can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. However, oversized game balls well in excess of 1.800 inches are also contemplated by the present invention.

Several physical properties such as hardness, resilience and modulus of the various layers of the golf balls of the present invention are believed to impact the playing characteristics of such golf balls. For example, the flexural and/or tensile moduli of the mantle layer are believed to have an effect on the "feel" of the golf balls of the present invention. Accordingly, it is preferable that the golf balls of the present invention have a mantle layer with a flexural modulus of about 500 psi to about 50,000 psi in order to impart a softer "feel" to the golf balls of the present invention. Likewise, it is preferred that the one or more mantle layer(s) have a tensile modulus of about 500 psi to about 50,000 psi in order to impart a softer "feel" to the golf balls of the present invention. More preferably, the flex modulus and tensile modulus of the one or more mantle layer(s) are both less than about 10,000 psi. Most preferably, the flex modulus of the mantle layer(s) is less than 5000 psi.

Further, the core of the preferred embodiment golf balls of the present invention has a Bayshore resilience of about 30 to about 80. Preferably the core has a Bayshore resilience of abut 40 to about 70. The one or more mantle layer(s) of the present invention have a Bayshore resilience of about 35 to about 75. Preferably the mantle layers have a Bayshore resilience of about 60–70.

The preferred embodiment golf balls of the present invention have mantle layers with a Shore D hardness of less than about 60. Preferably, the Shore D hardness of the mantle layers is about 20 to about 60. Most preferably, the mantle layer has a Shore D hardness of about 30 to provide the soft "feel" desired. The core has a Shore D hardness of about 30 to about 65. Preferably, the core has a Shore D hardness of about 35 to about 60.

In another preferred embodiment ball, the specific gravities of the ball materials increase toward the center of the ball. In other words, the specific gravity of the core is greater than the specific gravity of the mantle layer(s), which is greater than the specific gravity of the cover. More particularly, the core preferably has a specific gravity greater than about 1.2, the mantle layer(s) has a specific gravity between about 1 and 1.2 and the cover has a specific gravity of less than about 1.1.

The golf balls of the present invention can be made by any conventional process employed in the golf ball art. For example, the solid cores can be either injection or compression molded. Similarly, the undersized wound cores of the present invention are produced through conventional means. The mantle layer is subsequently injection or compression molded about the core. It is important that the mantle material be able to sustain the temperatures applied during the application of the cover layer. The cover layer or layers are then injection or compression molded or cast about the mantle layer.

In the manufacturing of the ball, the core is compression molded. The one or more primary and secondary mantle layer(s) is molded over the core using a fixed-pin mold such that a plurality of apertures are formed in the mantle layer. Then the cover is molded over the mantle layer such that some of the cover material flows into the apertures in the mantle layer, thereby forming a mechanical interlock.

EXAMPLES

A series of trials could be conducted in which golf ball primary mantles are produced as set forth in Table 6 below:

TABLE 6

| Example | Matrix Material | Foam Granule |
|---|---|---|
| 1 | 10–95 wt % ionomer | 90–5 wt % peroxide or radiation cross-linked ionomer |
| 2 | 10–95 wt % ionomer | 90–5 wt % cross-linked metallocene |
| 3 | 10–95 wt % ionomer | 90–5 wt % cross-linked styrene-butadiene block copolymer |
| 4 | 10–95 wt % ionomer | 90–5 wt % cross-linked styrene-ethylene-butadine-styrene block copolymer |
| 5 | 10–95 wt % ionomer | Thermoplastic hytrel polyetherester |
| 6 | 10–95 wt % ionomer | Thermoplastic pebax polyetheramide |
| 7 | 10–95 wt % ionomer | Thermoplastic polyamide |
| 8 | 10–95 wt % ionomer | Thermoplastic polyurethane |
| 9 | 10–95 wt % ionomer | Thermosetting polyurethane |
| 10 | 10–95 wt % ionomer | Cross-linked PP, PE, LDPE, LLDPE, HDPE, EEA, EMA or other non-ionomeric olefinic polymers |
| 11 | 25–95 wt % thermosetting PU (cast, RIM, etc.) | 5–75 wt % cross-linked ionomer |
| 12 | 25–95 wt % thermosetting PU (cast, RIM, etc.) | 5–75 wt % cross-linked metallocene |
| 13 | 25–95 wt % thermosetting PU (cast, RIM, etc.) | 5–75 wt % polyamide |
| 14 | 25–95 wt % thermosetting PU (cast, RIM, etc.) | 5–75 wt % polyetherester |
| 15 | 25–95 wt % thermosetting PU (cast, RIM, etc.) | 5–75 wt % polyurethane |
| 16 | 25–95 wt % thermosetting PU (cast, RIM, etc.) | 5–75 wt % polyetheramide |

In each example 1–10 the cover or mantle layer, as compared to a 100% ionomer cover or mantle layer, would exhibit an improved soft feel with minimal change in C.O.R. or durability (cut resistance or crack resistance), and ease of molding as compared to a cover or mantle layer comprising 100% foamed material. In each example 11–16 the cover or mantle layer, as compared to a cover or mantle layer comprising a 100% thermosetting polyurethane, would exhibit an improved soft feel with minimal change in C.O.R. or durability and ease of molding. Because the foamed polymers in examples 5–8 and 13–16 melt at temperatures above the processing or molding temperatures of the matrix material (ionomer) it is not necessary to crosslink the foam.

The invention has been described with reference to the preferred embodiments. Obviously, modifications and alterations will occur to others upon a reading and understanding of the preceding detailed description. It is intended that the invention be construed as including all such alterations and modifications insofar as they come within the scope of the appended claims or the equivalents thereof.

I claim:

1. A golf ball comprising;
   a core;
   at least one cover layer disposed about said core, wherein said at least one cover layer comprises a material selected from the group consisting of polyether thermoplastic urethanes, polyester thermoplastic urethanes and thermoset polyurethanes; and
   a mantle layer disposed about said core and between said core and said cover layer, said mantle comprising a polymeric matrix material and a plurality of foam granules dispersed within said polymeric matrix material, said granules having a mean diameter of from about 0.001 inches to about 0.200 inches and defining a plurality of cells within their interior,
   wherein the cover layer comprises at least an inner cover layer and an outer cover layer.

2. The golf ball of claim 1 wherein said granules have a specific gravity of from about 0.01 to about 0.8.

3. The golf ball of claim 1 wherein said mantle layer has a thickness from about 0.005 inches to about 0.500 inches.

4. The golf ball of claim 1 wherein the weight ratio of said matrix material to said granules ranges from about 10 to 95% matrix material to about 5 to 90% granules.

5. The golf ball of claim 1, wherein the inner cover layer is selected from the group consisting of polyether thermoplastic urethanes, polyester thermoplastic urethanes and thermoset polyurethanes.

6. The golf ball of claim 1, wherein the outer cover layer is selected from the group consisting of polyether thermoplastic urethanes, polyester thermoplastic urethanes and thermoset polyurethanes.

7. The golf ball of claim 1, wherein at least one of the inner and outer cover layers comprises an ionomer resin or blend of ionomer resins.

8. The golf ball of claim 1, wherein said foam particles comprise one or more materials selected from the group consisting of ionomers, non-ionomeric polyolefins, metallocene catalyzed polymer, polyethylene ethyl or methyl acrylate, styrene butadiene elastomer, thermoplastic polyester, thermoplastic polyetherester, thermoplastic polyetheramide, polyamide, polycarbonate, polyphenylene oxide, thermoplastic or thermoset polyurethane, silicone elastomer, dynamically vulcanized elastomer, and combinations or blends thereof.

9. The golf ball of claim 1, wherein said foam granules are crosslinked.

10. The golf ball of claim 9, wherein the crosslinking of the foam granules is before incorporation into the polymeric matrix.

11. A golf ball comprising:
    a core;
    at least one cover layer disposed about said core, wherein said at least one cover layer comprises a material selected from the group consisting of polyether thermoplastic urethanes, polyester thermoplastic urethanes and thermoset polyurethanes; and a plurality of foam granules dispersed in said core, said granules having a mean diameter of from about 0.001 inches to about 0.200 inches and defining a plurality of cells within their interior, and wherein said foam granules comprise one or more materials selected from the group consisting of ionomers, non-ionomeric polyolefins, metallocene catalyzed polymer, polyethylene ethyl or methyl acrylate, styrene butadiene elastomer, thermoplastic polyester, thermoplastic polyetherester, thermoplastic polyetheramide, polyamide, polycarbonate, polyphenylene oxide, thermoplastic or thermoset polyurethane, silicone elastomer, dynamically vulcanized elastomer, and combinations or blends thereof.

12. The golf ball of claim 11 wherein said granules have a specific gravity of from about 0.01 to about 0.8.

13. The golf ball of claim 11 wherein said core comprises a matrix material and the weight ratio of said matrix material to said granules ranges from about 10 to 95% matrix material to about 5 to 90% granules.

14. The golf ball of claim 11, wherein the cover layer comprises at least an inner cover layer and an outer cover layer.

15. The golf ball of claim 14, wherein the inner cover layer is selected from the group consisting of polyether thermoplastic urethanes, polyester thermoplastic urethanes and thermoset polyurethanes.

16. The golf ball of claim 14, wherein the outer cover layer is selected from the group consisting of polyether thermoplastic urethanes, polyester thermoplastic urethanes and thermoset polyurethanes.

17. The golf ball of claim 14, wherein at least one of the inner and outer cover layers comprises an ionomer resin or blend of ionomer resins.

18. The golf ball of claim 11, wherein said foam granules are crosslinked.

19. The golf ball of claim 11, wherein the crosslinking of the foam granules is before incorporation into the core.

* * * * *